No. 698,432. Patented Apr. 29, 1902.
J. W. BLAKEY.
INCANDESCENT GAS BURNER.
(Application filed Sept. 9, 1901.)

(No Model.) 2 Sheets—Sheet 1.

WITNESSES:
Isabella Waldron
Adelaide Claire Gleason

INVENTOR
James William Blakey
BY Richardson
ATTORNEYS

No. 698,432. Patented Apr. 29, 1902.
J. W. BLAKEY.
INCANDESCENT GAS BURNER.
(Application filed Sept. 9, 1901.)
(No Model.) 2 Sheets—Sheet 2.

WITNESSES:
Isabella Waldron.
Adelaide Claire Gleason.

INVENTOR
James William Blakey
BY Richardson
ATTORNEYS

United States Patent Office.

JAMES WILLIAM BLAKEY, OF BRADFORD, ENGLAND, ASSIGNOR OF TWO-THIRDS TO WILLIAM GEORGE STANSFIELD, OF BRADFORD, ENGLAND.

INCANDESCENT GAS-BURNER.

SPECIFICATION forming part of Letters Patent No. 698,432, dated April 29, 1902.

Application filed September 9, 1901. Serial No. 74,805. (No model.)

*To all whom it may concern:*

Be it known that I, JAMES WILLIAM BLAKEY, a subject of the King of Great Britain and Ireland, residing at 155 Ryan street, Bradford, in the county of York, England, have invented certain new and useful Improvements in and Connected with Incandescent Gas-Burners, (for which I have obtained provisional protection in Great Britain, No. 5,022, dated March 9, 1901,) of which the following is a specification.

My invention has for its object the construction and supporting of incandescent gas-burners, so that a brilliant light is produced and the liability of damage to the mantle minimized; and the invention consists in constructing the burner with a double cone—that is to say, a portion of the gas and air mixing chamber is a conical tube, the upper portion of which is at a different angle to the bottom portion, which terminates with a wider base. The continuation-rod for supporting the mantle is by preference attached to the upper portion of the conical tube, and communicating with the interior of said portion of conical tube is what may be termed a "circular box" provided with a gauze or perforated cover. The conical tube and box constitute the gas and air mixing chamber. The gas flows from suitable outlets into the wide base of the conical tube, and the said tube, together with the mantle, gallery, and other appendages, is supported by a vertical rod fixed in the center of a boss, through which the gas is supplied to the burner. The rod terminates at the top of the conical tube in a point to allow the whole of the parts supported thereby to rock freely. Instead of the vertical rod commencing as a fixture in the center of the gas-supply boss the said rod may be extended toward the base of burner and formed into a coiled spring, so that in addition to allowing the conical tube to rock freely on the end of the support the latter is also resilient.

In describing my invention more in detail reference is made to the accompanying drawings, in which—

Figure 1:
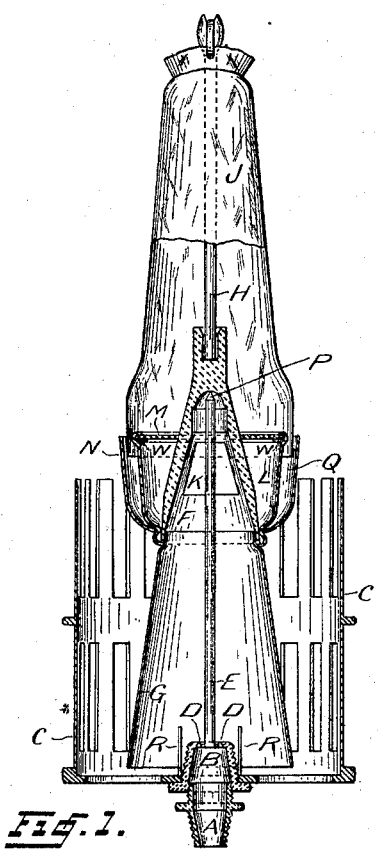
Figure 4:
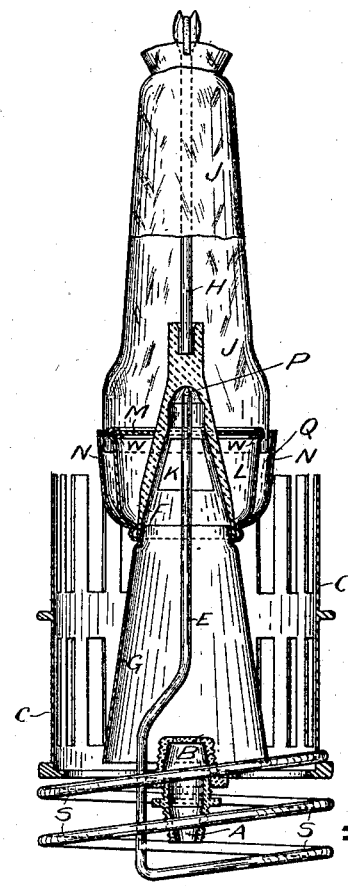
Figure 2:
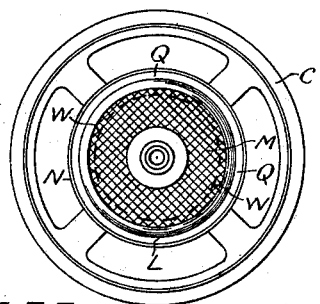
Figure 3:
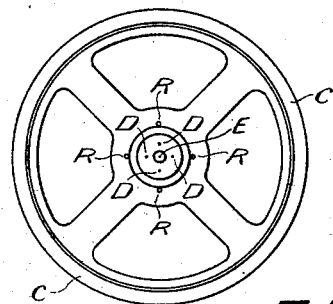
Figure 5:
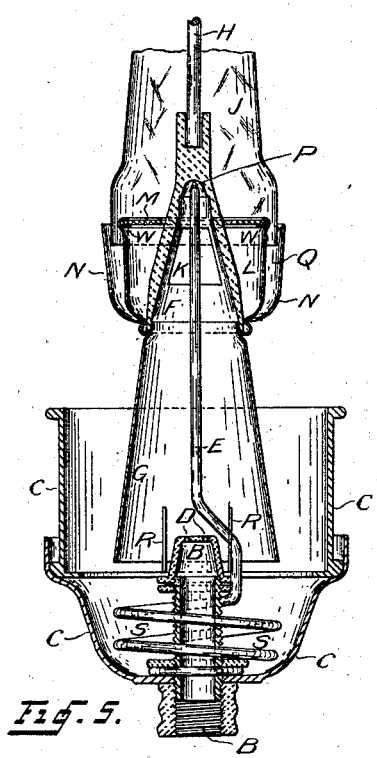
Figure 6:
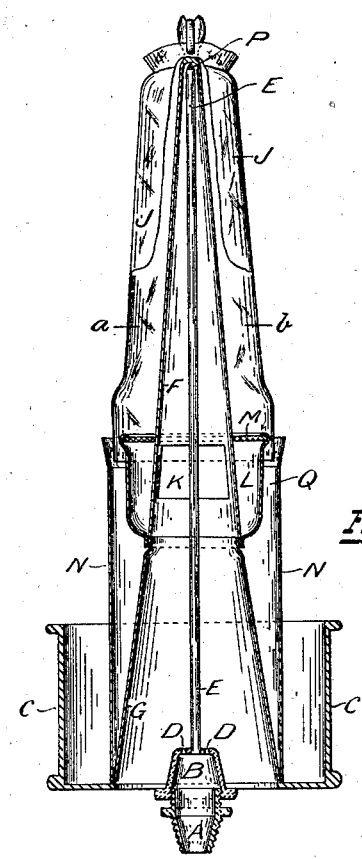
Figure 8:
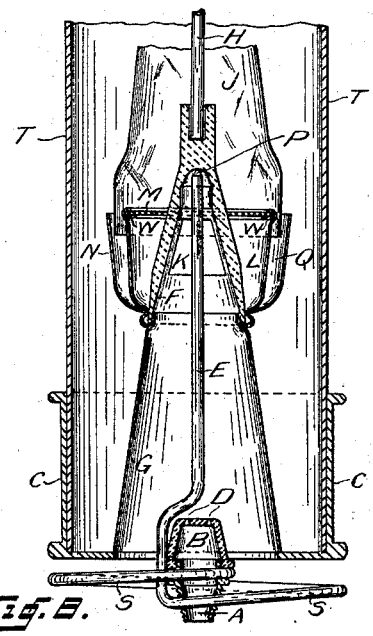
Figure 7:
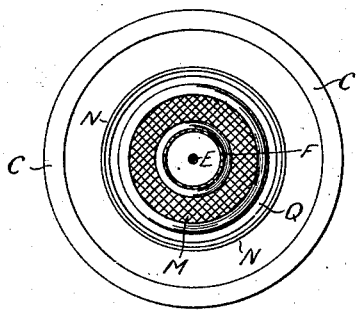

Figure 1 represents a vertical elevation of an incandescent gas-burner constructed according to my invention. The burner and gallery are shown in section and the gallery is secured to the boss of the gas-supply. Fig. 2 is a plan of the burner and gallery with the mantle removed. Fig. 3 is a plan of the gallery, showing the boss of the gas-supply, with the vertical rod in the center of the said supply. Fig. 4 is a similar elevation to Fig. 1, showing the vertical rod commencing at its base as a spring for giving resilient support to the gas-burner and mantle. Fig. 5 is a similar elevation to Fig. 4, showing the vertical rod commencing at its base as a spring secured in a modified manner for giving resilient support to the gas-burner and mantle. Fig. 6 is a similar sectional elevation showing the burner and gallery connected together with the upper portion of the conical tube extended. Fig. 7 is a plan of same through sectional line *a b;* and Fig. 8 is a sectional elevation showing the burner and gallery connected together and supported by a vertical rod, commencing at its base as a spring, secured to the nipple or boss for giving resilient support to the burner, mantle, and chimney.

In all the figures similar letters indicate similar parts where they appear.

The construction of my improved incandescent burner is as follows: The nipple A is arranged to screw into an ordinary gas-fitting. Upon the upper portion of the nipple A is screwed the boss B of gallery C. Into the center of the boss B is secured a vertical rod E, terminating in a point. The gas-supply is passed through perforations D D in the said boss around the base of rod E, as in Figs. 1 and 6. Upon the top P of the vertical rod E is centered a double cone. The circular wall of the upper portion of the conical tube F is at a different angle to that of the lower portion G, and the base of G is greater than the base of F. As the result of many experiments I find that the best angles to be given to the cones are those shown in the drawings, although slight alterations in the angles of the cones may be made. The upper and outer portion of the conical tube F is extended and arranged for the reception of a continuation-rod H for supporting the mantle J. The two rods E and H are in alinement. Through the circular wall of the upper portion of the conical tube holes K K are cut in F, forming openings between the interior of the conical tube and circular box L. The circular box L is provided with a gauze or perforated cover M. The outer circumference of the circular box L is provided with a circular shield N, an annular space Q being for the reception of the lower edge of the mantle. The mantle J is placed onto the continuation-rod H. The lower edge of the same is inserted into the annular space Q.

On opening the gas-supply tap the gas issues through the perforations D D forward into the base of the open-ended conical tube, wherein the gas mixes with the air, the combination passing through holes K into the circular box L and through the gauze or perforated cover M, where it is lighted for heating the mantle J to incandescence.

By centering or supporting the gas-burner as described on a vertical rod E in the manner as shown and described it will be seen that the burner and mantle J are free to swing or oscillate together on the point P of the vertical rod E, thus reducing vibration to a minimum and giving to the mantle a longer life than hitherto.

A washer W may be introduced below the gauze covering M for more effectually supporting the same around the outer circumference and obtaining the necessary area of outlet through the gauze M for completely consuming the gas and air.

To the boss B a number of light springs R may be secured, extending vertically within the base of the conical tube. The vertical springs are at such a distance from the center that should the gas-burner receive a shock, causing it to oscillate freely on the point P of vertical rod E, the interior surface of the conical tube will come in contact with one or more of the vertical springs R, which form a cushion for gradually stopping the swinging of the gas-burner and mantle J, supported thereby.

In the modifications shown by Figs. 4 and 5 the vertical rod E is not secured to the center of boss B, as before described, but is diverted and coiled into spring S, the end of which is secured to the gallery C, as shown by Fig. 4, or to the boss B, as shown by Fig. 5, so that should the gas-fitting receive a shock not only will the gas-burner and suspended mantle J rock freely on the point P of the vertical rod E, but by the bottom portion of the rod being coiled into a spring S the said spring will yield and give resilience to the gas-burner and mantle J, supported thereby.

In the burner shown by sectional elevation in Fig. 6 the upper portion of the conical tube is extended and supported on the point P of vertical rod E projecting from the boss B, fixed in the center of the gas-supply the same as in Fig. 1; but the gallery C is attached to the base of the lower portion G of the conical tube, so that should the gas-fitting be suddenly moved not only will the gas-burner and mantle J rock freely on the point P of the vertical rod E, but the gallery C also, which is arranged to carry an outer globe in the ordinary manner, so that by the whole being self-contained and supported on the point P of the vertical rod E move together.

The base of the lower portion G of conical tube of burner (shown by sectional elevation in Fig. 8) is secured to the gallery C, as is the case with Fig. 6; but the vertical rod E commences at the bottom as a spring S, secured in any convenient manner to the center boss B, so that by the whole being supported by the vertical rod E, as shown, not only are the burner, mantle J, gallery C, and chimney T free to rock on the point P of the vertical rod E, but the spring S gives resilience to the same, thereby minimizing any sudden shock that may be given to the burner or gas-bracket.

What I claim as my invention is—

1. In combination in an incandescent gas-burner, the mantle, a rod for supporting the mantle, means for supporting the rod and a centrally-arranged pivot-support having a pivot-point upon which said supporting means rests, substantially as described.

2. In combination in incandescent lamps, a cone-shaped mixing-chamber having its apex uppermost, a pivot-support within said cone-shaped mixing-chamber and having its pivot-point located at the apex.

3. In an incandescent burner, the mantle, means for directly supporting the mantle, and a pivot-support therefor including a centrally-arranged pivot-point, substantially as described.

4. In an incandescent burner, the mantle, means for directly supporting the mantle and a pivot-support therefor including a centrally-arranged pivot-point with means for holding the same yieldingly, substantially as described.

5. In combination in an incandescent gas-burner, a mantle, a mixing-chamber and a gallery with means for supporting all the said parts pivotally, said means including a centrally-arranged pivot-point, substantially as described.

6. In combination in an incandescent gas-burner, a mantle, means for supporting the same directly and a pivot-support comprising a rod extending up into the burner, substantially as described.

7. In combination in an incandescent gas-burner, a mantle, means for supporting the same directly and a pivot-support comprising a rod extending up into the burner, said rod being yieldingly supported, substantially as described.

8. In combination, a mantle, a double-coned mixing-chamber, a rod extending up into the mixing-chamber to support the same pivotally, the said mantle being supported by the said mixing-chamber, substantially as described.

In testimony whereof I have hereunto set my hand in the presence of two subscribing witnesses.

JAMES WILLIAM BLAKEY.

Witnesses:
JNO. GILL,
JOSEPH P. KIRBY.